United States Patent [19]
Brodsky, Sr.

[11] Patent Number: 5,425,405
[45] Date of Patent: Jun. 20, 1995

[54] ROUTER AND SHAPER GUIDE

[76] Inventor: Ronald R. Brodsky, Sr., 303 Veterans Dr., Palmyra, N.J. 08065

[21] Appl. No.: 273,483

[22] Filed: Jul. 11, 1994

[51] Int. Cl.$^6$ .................................................. B27C 5/04
[52] U.S. Cl. .................................. 144/253 J; 33/464; 33/640; 144/253 R
[58] Field of Search .................. 83/468.7; 33/454, 464, 33/628, 640, 641; 144/134 R, 136 R, 253 R, 253 J

[56] References Cited

U.S. PATENT DOCUMENTS

| | | | |
|---|---|---|---|
| 1,664,969 | 4/1928 | Conover | 144/253 J |
| 4,304,276 | 12/1981 | Termini | 144/253 J |
| 5,353,515 | 10/1994 | Alvis et al. | 33/640 |

Primary Examiner—W. Donald Bray

[57] ABSTRACT

A router and shaper guide wherein a positioning rib is arranged for reception within a support table guide groove, such that a first guide plate is arranged for abutment with the positioning rib and the second guide plate is arranged for sliding engagement with the first guide plate to provide for a guide surface for positioning of a workpiece or guide fence therealong, such that the first and second guide plates are arranged for engagement along respective guide walls that are oriented at acute angles relative to the positioning rib to permit lateral adjustment spacing of the guide fence relative to the positioning rib.

5 Claims, 4 Drawing Sheets

ROUTER AND SHAPER GUIDE

TECHNICAL FIELD

The field of invention relates to router apparatus, and more particularly pertains to a new and improved router and shaper guide wherein the same is directed to the provision of an alignment wall to direct a workpiece therealong for use with a router assembly.

BACKGROUND OF THE INVENTION

The field of invention relates to guide apparatus and guide fence structure wherein such is indicated in U.S. Pat. Nos. 5,016,358; 5,240,052; 4,197,887; 5,052,5; and 3,509,923. The prior art has heretofore failed to provide for the utilization of guiding template structure as employed by the instant invention that permit the spaced positioning of a guide wall relative to a reference line.

SUMMARY OF THE INVENTION

The present invention relates to a guide wall, and more particularly pertains to a router and shaper guide wherein the same employs spaced guide plates having sliding guide surfaces that are oriented at substantially seventeen degrees relative to respective first and second side walls of the respective first and second guide plates, with the first guide plate having a guide flange receivable within a guide slot of the second guide plate.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
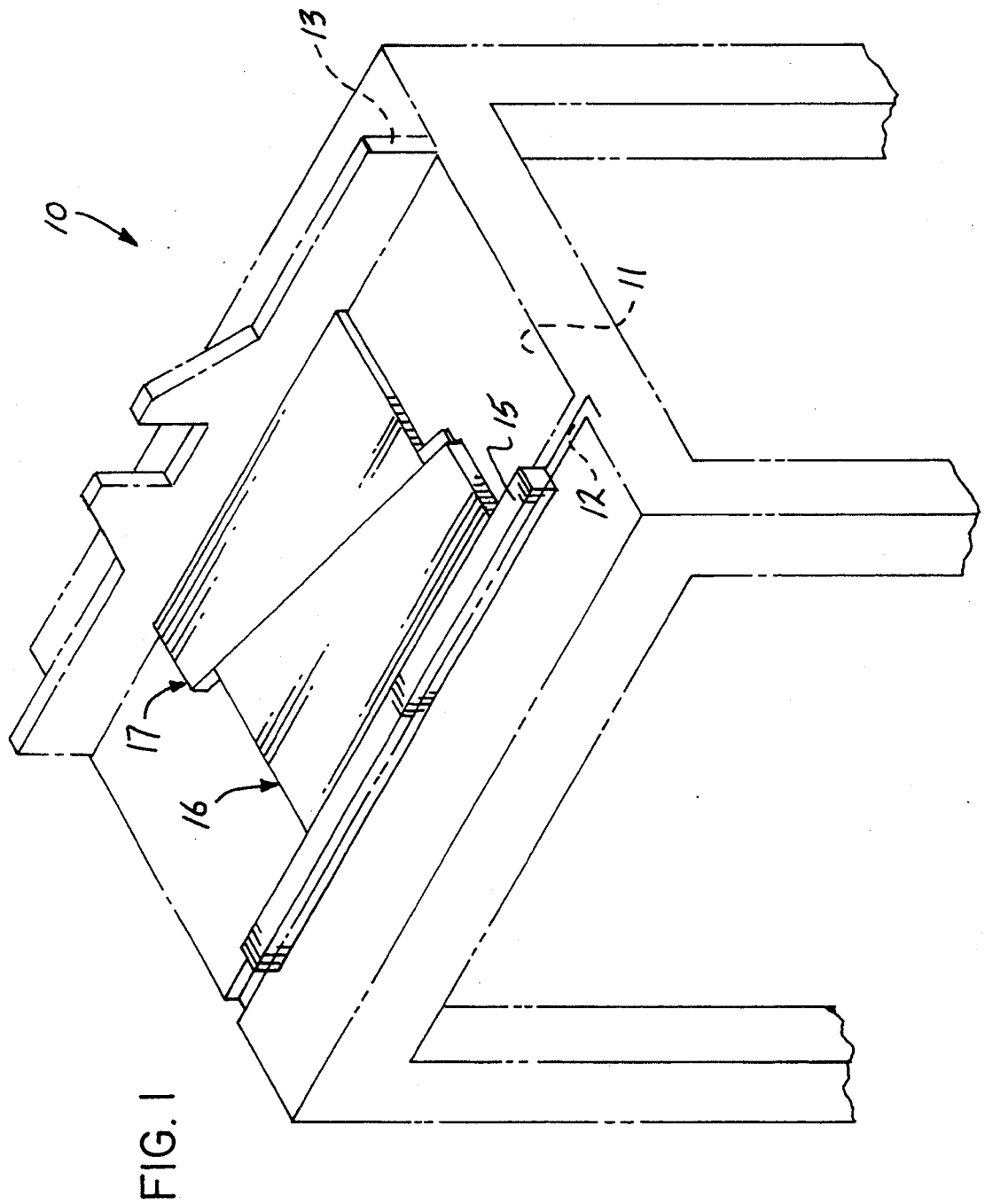
FIG. 1 is an isometric illustration of the invention.
Figure 2:
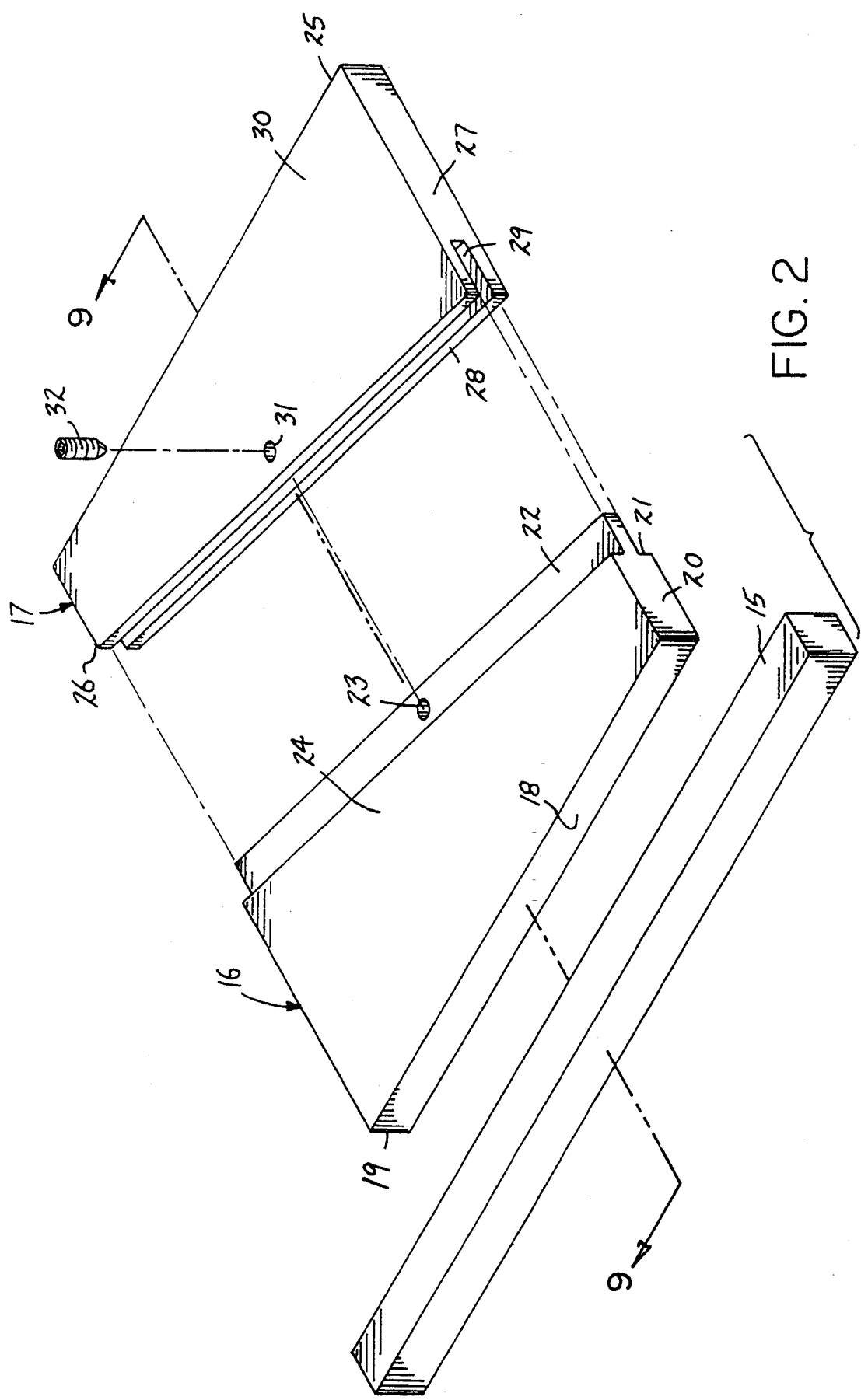
FIG. 2 is an isometric enlarged illustration of the invention in an exploded view.
Figures 3, 4:
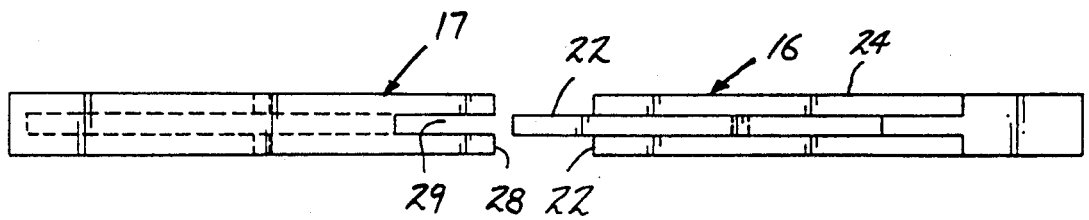
FIG. 3 is an orthographic end view of the second guide plate.
FIG. 4 is an orthographic end view of the first guide plate.
Figures 5, 6:
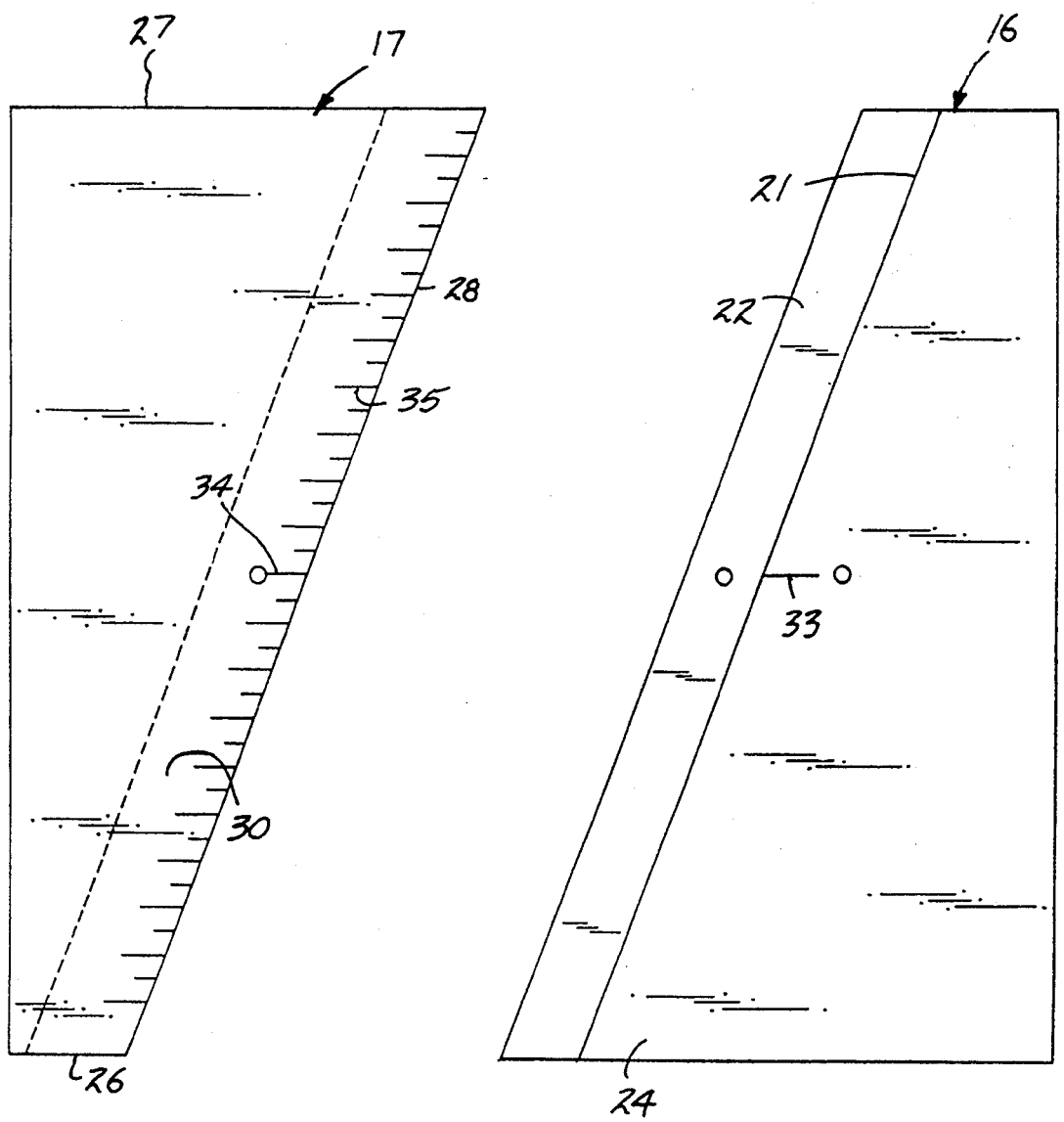
FIG. 5 is an orthographic top view of the second guide plate.
FIG. 6 is an orthographic top view of the first guide plate.
Figure 7:
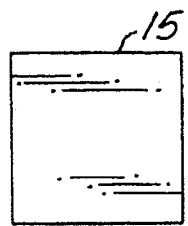
FIG. 7 is an orthographic end view of the positioning rib.
Figure 8:
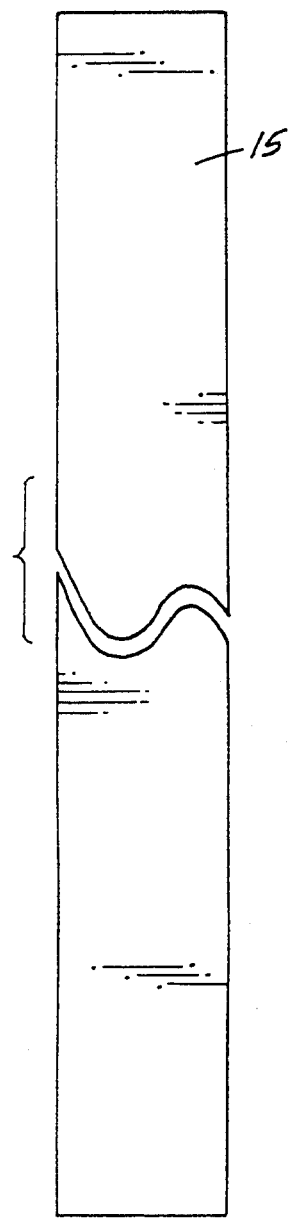
FIG. 8 is an orthographic top view of the positioning rib.

The router and shaper guide structure 10 is indicated in FIG. 1 and arranged for use with a support table 11 having a guide groove 12 directed into the support table to direct a guide fence 13 in a spaced relationship a predetermined and adjustable spacing relative to the guide groove 12 by use of the invention 10. If desired, the guide fence 13 may be deleted and a workpiece alternatively directed along the invention. To this end, a positioning rib 5 is positioned within the guide groove 12 to provide a reference abutment to receive a first guide plate 16 that in turn slidingly and adjustably receives a second guide plate 17. The first guide plate 6 is formed with a first plate first guide wall 8 and spaced first and second side walls 9 and 20 of the first plate 16, such that a second guide 21 extends in a spaced relationship relative to the first guide wall 18, with the second guide wall 21 substantially oriented at seventeen degrees relative to the first guide wall 18. A guide flange 22 projects orthogonally from the second guide wall 21, with an aperture 23 directed medially of the guide flange 22. A first plate top wall 24 is provided and with reference to FIG. 6, it should be noted that the first plate top wall 24 is provided with a first plate medial indicia 33 to provide a medial reference point along the first plate top wall 24.

Figure 9:
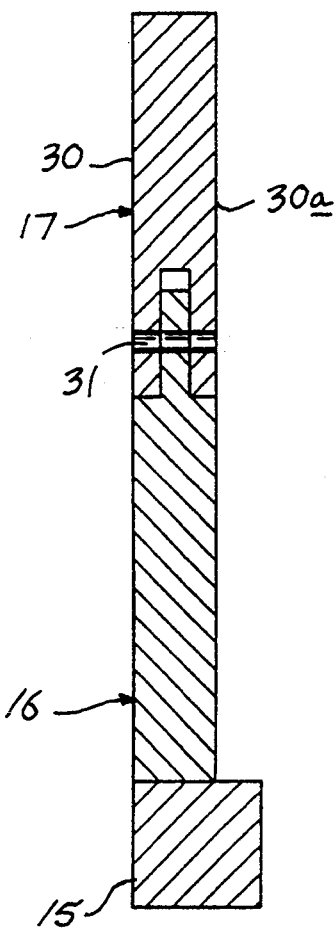
FIG. 9 is an orthographic view, taken along the lines 9—9 of FIG. 2 in the direction indicated by the arrows.

With reference to the FIGS. 1–5, the second guide plate 17 is provided with a second plate first guide wall 25 that provides for guidance of a workpiece or fence structure, as indicated in FIG. 1, with the second plate having a second plate first side wall 26 spaced from a second plate second side wall 27 and a second guide wall 28 arranged for sliding engagement with the first plate second guide wall 21. A second guide wall groove 29 is directed into the second guide wall 28 to receive the guide flange 22. The second plate 17 is provided with second plate top wall 30 spaced from a second plate bottom wall 30a (see FIG. 9) to receive a top wall opening 31 that extends through the top wall and projects through the bottom wall 30a, as illustrated in FIG. 9, such that a fastener 32 may be directed through the top wall opening 31 and received within the aperture 23 to secure the first and second plates together to maintain the alignment of the first plate medial indicia 33 with a second plate medial indicia 34 oriented medially of the second plate top wall 30 adjacent the second plate second guide wall 28. A graduated scale 35 extends along the second plate top wall 30 extending to the second plate first and second side walls 26 and 27. In this manner, reproduction, incremental and reproducible positioning of the first guide plate relative to the second guide plate is available to provide a reproducible spacing of the guide fence 13 relative to the support tables guide groove 12, as illustrated in FIG. 1.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by letters Patent of the United States is as follows:

1. A router and shaper guide arranged for positioning within a support table, wherein the support table includes a support table guide groove, and wherein the router and shaper guide comprises, a positioning rib, and a first guide plate arranged for abutment with the positioning rib, and a second guide plate arranged for sliding engagement with the first guide plate, the first guide plate having a first plate first guide wall arranged for engagement with the positioning rib, and a first plate second guide wall spaced from the first plate first guide wall, with the first plate second guide wall oriented at an acute angle relative to the first plate first guide wall, and the second guide plate having a second guide plate first guide wall and a second plate second guide wall spaced from the second plate first guide wall, with the second plate second guide wall oriented at an acute angle relative to the second plate first guide wall.

2. A router and shaper guide as set forth in claim 1 wherein the first plate first guide wall includes a guide flange projecting therefrom, and a first plate top wall, wherein the first plate guide flange is arranged parallel relative to and spaced from the first plate top wall, and the second plate having a second plate top wall, and a second plate groove extending into the second plate second guide wall, wherein the second plate groove is oriented parallel to the second plate top wall, the first plate having a predetermined thickness and the second plate having a predetermined thickness, wherein the second plate top wall is coplanar with the first plate top wall.

3. A router and shaper guide as set forth in claim 2 wherein the first plate includes a first plate medial indicia positioned medially of the first plate top wall adjacent the first plate second guide wall, and the second plate having a second plate medial indicia imparted upon the second plate top wall adjacent the second plate second guide wall.

4. A router and shaper guide as set forth in claim 2 wherein the second guide plate includes a second guide plate first side wall and a second guide plate second side wall, and the second guide plate having a graduated scale extending from opposed sides of the second plate medial indicia and extending to the second plate first side wall and second plate second side wall.

5. A router and shaper guide as set forth in claim 4 wherein the second plate includes a second plate bottom wall and a second plate opening extends through the top wall, through the second plate bottom wall, and the first plate guide flange includes an aperture, and wherein the aperture is positioned in alignment with the first plate medial indicia, and the second plate opening is arranged in alignment with the second plate medial indicia, and a fastener arranged for reception through the aperture and the opening to secure the first guide plate relative to the second guide plate in a fixed relationship to maintain alignment of the first plate medial indicia with the second plate medial indicia.

* * * * *